May 13, 1969 H. M. HOEKSEMA 3,444,439

ELECTRICAL TIMER SYSTEM HAVING ELECTROLYTIC TIMING CELL

Filed Oct. 19, 1966

INVENTOR.
HENDRIKUS MARIUS HOEKSEMA
BY Roger W. Jensen
ATTORNEY

United States Patent Office 3,444,439
Patented May 13, 1969

3,444,439
ELECTRICAL TIMER SYSTEM HAVING
ELECTROLYTIC TIMING CELL
Hendrikus M. Hoeksema, Doernigheim (Main), Germany,
assignor to Honeywell G.m.b.H., Frankfurt am Main,
Germany, a corporation of Germany
Filed Oct. 19, 1966, Ser. No. 587,861
Claims priority, application Germany, Nov. 4, 1965,
H 57,588
Int. Cl. H01g 9/00, 9/18
U.S. Cl. 317—231                9 Claims

ABSTRACT OF THE DISCLOSURE

This invention relates generally to electronic circuitry, more particularly to electronic circuitry which forms a timer, and more specifically to an electronic timer which uses an electrolytic cell for timing control.

Background of the invention

Figure 1:
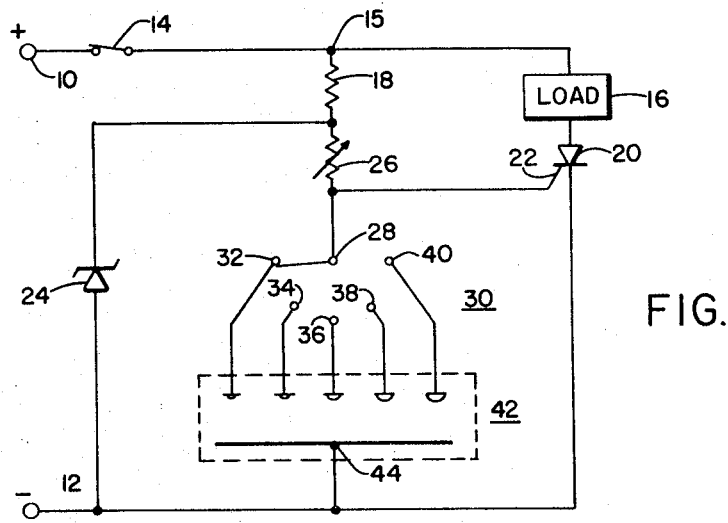

This invention deals with an electric timer using an electrolytic cell of the type shown and described in an article published on Nov. 16, 1964, in Electronics magazine by Herbert Feitler entitled, "Simple Cell Competes With Complex Components."

Briefly, an electrolytic cell is one in which a current flow through the electrolyte causes a predetermined quantity of platable material to be transferred from one electrode to another. The quantity of platable material on the electrode together with the amperage determines the duration of the plating cycle and the time delay caused by the timer. At the end of each plating cycle, a voltage step appears at the electrolytic cell which may be used for initiating a switching operation. The time period of such an electrolytic timer can be adjusted by changing the amperage of the current flowing through the cell. This may be accomplished by means of an adjustable resistor which is in series with the cell. However, in order to provide accurate timing, it is necessary that the adjustable resistor be of high precision and that the voltage source be able to supply a constant voltage. Precision resistors of this kind are expensive voltage stabilization also leads to difficulties because, if different currents are used to obtain different timing delays, the different currents drawn from the voltage source cause instability themselves.

All these disadvantages of prior art electrolytic timers are avoided by the present invention. For achieving different time intervals, the electrolytic cell is provided with several electrodes on which different quantities of platable material is deposited. It is therefore possible to connect to only that electrode which bears an amount of platable material corresponding to the desired time interval. The current flowing through the cell is identical for all time intervals. This simplifies the stabilization of the supply voltage. Furthermore, it is simpler to match an electrolytic cell to any electronic switch controlled by the cell if the cell is always operated with the same current.

A further feature of the invention is that the electrodes are connected to the contacts of a step selection switch which can be stepped by impulses. This means that remote switching which enables the timer to differ the time interval is possible. An inhibit device or switch which is controlled by the current flowing through the cells or by the voltage across the cell guarantees that the circuit can only be switched to another electrode if the plating process between the formerly active electrodes was finished which means that the total of the platable material is in some fashion re-deposited on its original electrode.

From electrolytic cell timers using only one pair of electrodes, it is well known to reverse the current direction at the end of a plating process and thereby repeat the plating process two or more times. A further improvement on this scheme is provided by the present invention whereby an electronic switch controlled by the voltage across the electrolytic cell reverses the current direction in the cell at the end of the plating process. Using this technique, the quantity of platable material which formerly was transferred from one electrode to a collector electrode is retransferred to the original electrode. This process can be repeated as often as required, and at the end of each plating cycle, a timing pulse is generated which can be used for any purposes.

Description of the invention

It is an object of this invention to provide an electronic timer having many possible timing periods through the use of a multi-electrode electrolytic cell.

It is another object of this invention to provide an electronic timer providing a continuous pulse train of timing pulses through the use of an electrolytic cell and mechanism to reverse the current through the electrolytic cell to reverse the plating process.

Figure 2:
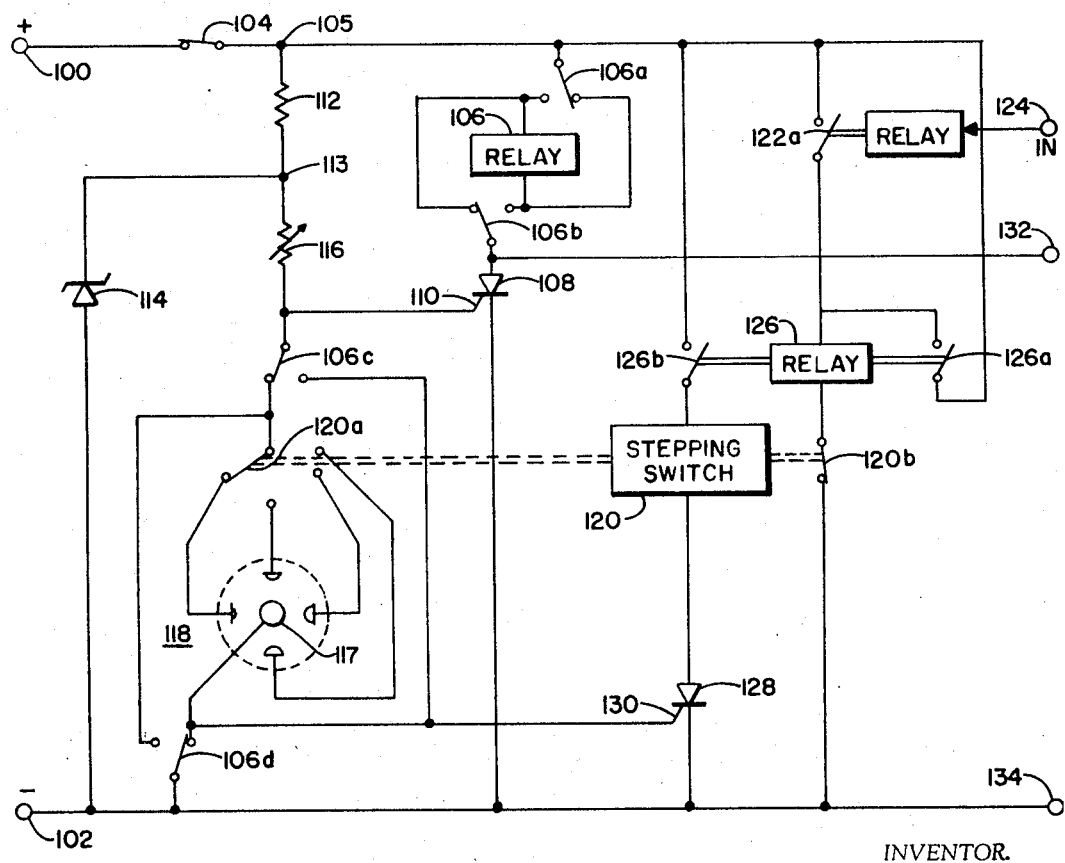

Further objects and advantages will become apparent from a reading of the specification and claims in conjunction with the drawings wherein:

FIGURE 1 shows a circuit using an electrolytic cell to delay power to a load, where there is a choice of time delays; and FIGURE 2 shows a circuit using an electrolytic cell for periodically creating long interval pulses, through the use of a current reversing mechanism, with the possibility of changing the pulse rate.

In FIGURE 1 terminals 10 and 12 are adapted to be connected to an appropriate supply of power or predictable source of current. A power switch 14 is connected between terminal 10 and a junction point 15. One end of a load 16 and one end of a resistor 18 are also connected to junction point 15 to receive power from input terminal 10 when switch 14 is closed to initiate the timing cycle. A silicon controlled rectifier or silicon controlled switch 20 has its anode connected to the other end of load 16 and its cathode connected to terminal 12. Silicon controlled switch 20 has a gate input 22 which controls the firing of silicon controlled switch 20 to control the power delivered to load 16. A variable resistor 26 is connected between the other end of resistor 18 and gate input 22 of silicon control switch 20. A Zener diode 24 has its cathode connected to the junction of variable resistor 26 and resistor 18 and its anode connected to terminal 12. Zener diode 24 stabilizes the voltage supplied to variable resistor 26. A switching arm 28 of a multi-position switch 30 also connects to the junction of gate element 22 of silicon control switch 20 and variable resistor 26. Multiposition switch 30 has positions 32, 34, 36, 38, and 40 individually connected to anode electrodes of an electrolytic cell 42. These anode electrodes initially have deposition material deposited on them in various amounts in preparation for deposition upon another electrode, cathode for collector 44 of electrolytic cell 42. Electrode 44 of electrolytic cell 42 is also connected to terminal 12.

In FIGURE 2, terminals 100 and 102 are adapted to be connected to an appropriate source of power or predictable supply of current. A power switch 104 is connected between terminal 100 and a junction point 105 in order to control the power to the remainder of the circuit. Also in FIGURE 2 there is a relay 106 having four sets of single pole, two position contacts 106a, 106b, 106c, and 106d. The movable arm of contacts 106a, is connected to junction point 105 in order to receive power. A first position of contacts 106a is connected to a first position of contacts 106b and to a first side of relay 106. The other side of relay 106 is connected to a second position of contacts 106a and a second position of contacts 106b in order to form a latching, reversing relay. The movable arm of contacts 106b is also connected to an anode of a silicon controlled rectifier or silicon controlled switch 108 which has a gate element 110. The cathode of silicon control switch 108 is connected to terminal 102. A resistor 112 is connected between junction point 105 and a junction point 113. A Zener diode 114 has its cathode connected to junction point 113 and its anode connected to terminal 102. A variable resistor 116 is connected between gate element 110 of silicon control switch 108 and junction point 113. Gate element 110 of silicon control switch 108 is also connected to the movable arm of contacts 106c. A first position of contacts 106c is connected to a first position of contacts 106d and an electrode, cathode, or collector electrode 117 of an electrolytic cell 118 having collector electrode 117 and a plurality of emitter type electrodes or anodes. Each anode is individually connected to one pole of a multi-position stepping switch 120. Each anode has a different amount of deposition material deposited on it a preparation for deposition on cathode 117. A second position of contacts 106c is connected to a second position of contacts 106d and to the movable arm 120a of multi-position stepping switch 120. Contacts 106c and 106d are connected so as to reverse the current through electrolytic cell 118 when relay 106 reverses and latches.

A relay 122 having an actuating input 124 has single pole, single throw contacts 122a connected between junction point 105 and a relay 126 with single pole, single throw contacts 126a. Contacts 126a are connected between junction point 105 and relay 126 to short around contacts 122a and latch a first end of relay 126 to junction point 105 after relay 126 is actuated. Relay 126 also has single pole single throw contacts 126b connected between junction point 105 and stepping switch 120. Stepping switch 120 also has single pole single throw contacts 120b which are opened each time the stepping switch advances. Contacts 120b are connected between the other end of relay 126 and terminal 102, so that power to relay 126 is interrupted during the time stepping switch 120 advances. The other end of stepping switch 120 is connected to an anode of another silicon control switch or silicon control rectifier 128 which has its cathode connected to terminal 102. Silicon control switch 128 has a gate element 130 which is connected to one position of contacts 106d and 106c. Output terminals 132 and 134 are connected to the anode of silicon control switch 108 and to terminal 102 respectively.

*Operation of the invention*

With reference of FIGURE 1, a current is applied to terminal 10, flows through switch 14, through load 16, through silicon controlled switch 20 and back to a terminal 12. It is seen that if silicon controlled switch 20 is nonconductive, no current will flow through the load. This allows a timer to control when current is allowed to flow through load 16, after application of power.

As switch 14 is closed and the delay cycle is started, current begins to flow through switch 14, through resistor 18, through variable resistor 26, through multiposition switch 30, and through electrolytic cell 42 to terminal 12. This current starts the deposition process. While the deposition process is occurring in electrolytic cell 42 the voltage across it is extremely small—10 to 100 millivolts. This means that the voltage from the gate element 22 of silicon controlled switch 20 to terminal 12 is not sufficient to turn silicon controlled switch 20 on. However, when the deposition process within electrolytic cell 42 is completed, the voltage across it begins to rise rapidly. This rapid rise in voltage is applied to gate element 22 of silicon controlled switch 20 and turns silicon controlled switch 20 into its conducting state, allowing the current to flow through load 16. Zener 24 regulates the voltage applied to variable resistor 26 to maintain the current through electrolytic cell 42 constant in order to hold the time delay constant. Variable resistor 26 provides for a fine adjustment of the time interval. Thus, it is seen that there is a time delay between the closure of switch 14 and application of power to load 16 which is determined by electrolytic cell 42. Various time periods may be chosen by using multiposition switch 30 to select one of the plurality of electrodes of electrolytic cell 42. This is because each electrode of electrolytic cell 42 has a different predetermined amount of deposition material deposited upon it, in order that each may provide a different time delay. The circuit of FIGURE 1 does not provide for redepositing the deposition material back onto the original electrode without a reversal of the power supply. The circuit of FIGURE 2 does.

With reference to FIGURE 2 the basic operation is the same and so need not be explained. However, reversing relay 106 is inserted so that the deposition process may be reversed and a periodic waveform generated. Stepping switch 120, relay 126, and relay 122 and their associated contacts are inserted to change time delays through the selection of the proper electrodes.

Relay 106, with contacts arranged as shown, will be actuated only when silicon controlled switch 108 is conducting. Silicon controlled switch 108 conducts only after the deposition process is complete within electrolytic cell 118. So, when silicon controlled switch 108 is rendered conducting, output terminals 132 and 134 are shorted together through silicon controlled switch 20 and current is conducted through relay 106. Relay 106 is a type of relay which may be actuated in either direction depending upon the direction of current. When current is conducted through relay 106, it is arranged that the contacts will move to the alternate poles. As contacts 106a, 106b, 106c, and 106d move to their alternate poles, the direction of current in electrolytic cell 118 is reversed. This initiates redeposition of material back to its original electrode and provides a periodic output. During the time relay 106 is switching, the current flow through silicon controlled switch 108 is interrupted rendering it nonconductive until switching is completed and a gating signal is applied to gate 110.

Relay 122, relay 126, stepping switch 120 and their associated contacts control the changing of the timing interval. Stepping switch 120 controls which electrode is connected to power and thus determines which electrode will perform the deposition process. When it is desired that the time interval be changed, an input is provided to actuating input 124 of relay 122. This causes contacts 122a to close. The closure of contacts 122a provides power to relay 126 which in turn causes contacts 126a and 126b to close. The closure of contacts 126a latches relay 126 to power by providing continuous power to it in dependent of the state of relay 122. The closure of contacts 126b provides power to stepping switch 120 causing stepping switch 120 to advance one step. When stepping switch 120 advances one step, contact 120b opens, as previously described. The opening of contact 120b removes power from relay 126, thereby causing contact 126b to open preventing stepping switch 120 from advancing further. All relays except stepping switch 120 then return to their original position. The above discussion assumes that silicon controlled switch 128 is conducting. Silicon controlled switch 128 is in the circuit to prevent a change of electrodes during the deposition onto its original electrode. It is seen that the gate element 130 of silicon controlled switch 128 is connected to the bottom of variable resistor 116 only during one-half of the cycle. This is the only time that the silicon controlled switch may be rendered conducting, since, during the other half of the cycle, gate element 130 is shorted to one end of silicon controlled switch 128. Thus, if the positions of contacts 106c and 106d are as shown for the deposition of material onto the common electrode or cathode, stepping switch 120 cannot be actuated during this time because silicon controlled switch 128 cannot be actuated during this portion of the cycle. After contacts 106c and 106d change to their alternate positions, from what is shown, gate element 130 is connected to the bottom of variable resistor 116 and can be actuated at the end of the deposition cycle. Therefore, if an actuating signal is received by relay 122, relay 126 will latch and close contacts 126b. This means that at the end of a complete deposition cycle, a silicon controlled switch closes, power is supplied to stepping switch 120 because everything else is in readiness. Thus the timing interval may be changed at this time.

It will be realized by those skilled in the art that various elements shown in FIGURE 1 and FIGURE 2 may be replaced by other parallel elements. For example, a transistor or other actuated switch means may be used in place of a silicon controlled switch. A solid state switching arrangement may be used in place of relays 122, 126, 120, and 106.

Other alterations and variations will be obvious to those skilled in the art. I do not wish to be limited to the specification nor to the particular embodiments shown in the figures, but only by the following claims in which I intend to cover all modifications which do not depart from the spirit or scope of this invention.

I claim:
1. Electric time delay apparatus comprising:
   (a) an electrolytic cell with a plurality of separate electrodes including electrically platable means on at least one electrode;
   (b) a pair of input terminals for connection to a predictable source of current;
   (c) means for selectively connecting said input terminals to two of said plurality of separate electrodes for conducting current through said cell whereby said platable means is redeposited from one of said electrodes onto another;
   (d) means for sensing an increase in voltage across said cell due to the ending of the redeposition of said conductive means and for providing an output upon said voltage increase; and
   (e) means responsive to the increase in voltage across said cell for reversing the direction of current in said cell in response to the increase in voltage whereby the deposition process is reversed in said cell.

2. The apparatus of claim 1 wherein said means for selectively connecting said input terminals, comprises means for changing the connection from one set of the separate electrodes to another in response to an input signal thereby producing a different timing interval.

3. The apparatus of claim 2 further comprising means for preventing any change in the means for reversing the direction of current in said cell, upon operativeness of the reversing means, without said platable means having been completely retransferred to said original electrode.

4. Timing apparatus, comprising:
   (a) an electrolytic cell having a cathode and a plurality of separate anodes each having a different amount of an electrically conductive platable material thereon for providing a plurality of individual deposition times;
   (b) a pair of input terminals for connection to a source of current;
   (c) means for selectively connecting said input terminals respectively to said cathode and one of said plurality of separate anodes for providing current flow through the cell whereby said platable material is redeposited from said one anode upon said cathode; and
   (d) means connected to said cell for switching the connection of said input terminals respectively to said cathode and any of said anodes in response to an increase in voltage across said cell when said platable material is completely redeposited on said cathode.

5. The apparatus of claim 4 further comprising means for sensing the increase in voltage across said cell upon the redeposition of said platable material upon said cathode and for reversing the direction of current through said cell in response to the increase in voltage whereby said platable material is restored upon said one anode.

6. The apparatus of claim 4 wherein said means for selectively connecting said input terminals comprises means for changing the connection from one separate anode to another in response to an input signal thereby producing a different timing interval.

7. The apparatus of claim 6 further comprising means for preventing any change in the means for switching the connection of said input terminals, upon operativeness of the switching means, without said platable material having been completely retransferred to the original electrode.

8. Timing apparatus comprising:
   (a) first and second input terminals for connection respectively to the positive and negative polarity terminals of a DC source;
   (b) an electrolytic cell having a cathode and a plurality of anodes, each of said anodes having deposited thereon a predetermined amount of an electrically platable material;
   (c) first means for connecting the cathode of said electrolytic cell to said second input terminal;
   (d) second means for connecting said anode electrodes to said first input terminal, said second means including a switching means connected between said first input terminal and said anodes for selectively connecting one of said anodes while disconnecting all others; and
   (e) output means connectable to said cathode and any one of said anodes for providing an output signal with the voltage thereof being a function of the anode voltage.

9. The apparatus of claim 8 further comprising means connected to said output means for reversing the direction of current through said cell in response to said output signal.

References Cited
UNITED STATES PATENTS

| | | | |
|---|---|---|---|
| 2,791,473 | 5/1957 | Mattox | 317—231 X |
| 3,052,830 | 9/1962 | Ovshinsky | 317—231 |
| 3,158,798 | 11/1964 | Sauder | 317—231 |
| 3,172,083 | 3/1965 | Constantine | 317—231 X |
| 3,210,662 | 10/1965 | Steinmetz et al. | 317—231 X |

JAMES D. KALLAM, *Primary Examiner.*

U.S. Cl. X.R.
324—94